US011981039B1

(12) United States Patent
Marfione

(10) Patent No.: US 11,981,039 B1
(45) Date of Patent: May 14, 2024

(54) POCKET KNIFE

(71) Applicant: Anthony Louis Marfione, Mills River, NC (US)

(72) Inventor: Anthony Louis Marfione, Mills River, NC (US)

(73) Assignee: Microtech Knives, Inc., Mills River, NC (US)

( * ) Notice: Subject to any disclaimer, the term of this patent is extended or adjusted under 35 U.S.C. 154(b) by 0 days.

(21) Appl. No.: 18/492,984

(22) Filed: Oct. 24, 2023

(51) Int. Cl.
*B26B 1/08* (2006.01)

(52) U.S. Cl.
CPC .................................... *B26B 1/08* (2013.01)

(58) Field of Classification Search
CPC ...................................................... B26B 1/08
See application file for complete search history.

(56) References Cited

U.S. PATENT DOCUMENTS

| | | | | |
|---|---|---|---|---|
| 2,243,030 | A * | 5/1941 | Fischer | B26B 1/08 30/162 |
| 6,085,423 | A | 7/2000 | Marifone | |
| 7,305,769 | B2 | 12/2007 | McHenry | |
| 7,562,455 | B2 | 7/2009 | McHenry | |
| 7,574,804 | B2 | 8/2009 | Bezold | |
| 8,595,941 | B2 | 12/2013 | Lee | |
| 8,671,578 | B1 | 3/2014 | Frazer | |
| 9,375,854 | B2 | 6/2016 | Chu | |
| 9,498,889 | B1 | 11/2016 | Hawk | |
| 9,764,485 | B1 | 9/2017 | Hawk | |
| 10,220,527 | B1 | 3/2019 | Marfione | |
| 10,500,740 | B1 | 12/2019 | Marfione et al. | |
| 10,807,253 | B1 | 10/2020 | Mandeville | |
| 11,607,818 | B1 | 3/2023 | Crawford et al. | |
| 2006/0207102 | A1 | 9/2006 | Bezold | |
| 2007/0175045 | A1 | 8/2007 | McHenry | |
| 2008/0222895 | A1 | 9/2008 | Marfione | |
| 2008/0222897 | A1 | 9/2008 | Marfione | |
| 2009/0235534 | A1 | 9/2009 | Chu | |
| 2014/0101943 | A1 | 4/2014 | Chu | |
| 2014/0173911 | A1 | 6/2014 | Chu | |
| 2021/0276204 | A1 * | 9/2021 | Marfione | B26B 1/10 |
| 2021/0299893 | A1 * | 9/2021 | Eckelkamp | B26B 1/08 |

FOREIGN PATENT DOCUMENTS

WO WO 2019/104295 A1 5/2019

* cited by examiner

*Primary Examiner* — Hwei-Siu C Payer
(74) *Attorney, Agent, or Firm* — Steve LeBlanc, LLC

(57) ABSTRACT

A pocket knife includes a chassis and a blade having a retracted position in which the blade is inside the chassis and a deployed position in which at least a portion of the blade is outside of the chassis. A tang of the blade has first and second legs that extend from the tang to define a recess in the tang between the first and second legs. At least a portion of the chassis extends into the recess in the tang between the first and second legs when the blade is in the retracted position.

19 Claims, 12 Drawing Sheets

POCKET KNIFE

FIELD OF THE INVENTION

The present invention generally involves a pocket knife. In particular embodiments, the pocket knife may be a double action, out-the-front configuration.

BACKGROUND OF THE INVENTION

Pocket knives provide a convenient tool for cutting that may be easily carried by a user for deployment when desired. For some pocket knife designs, two hands are needed to deploy and retract a blade, while other designs include a spring that assists a user to deploy and/or retract the blade using a single hand. Each design balances the convenience and speed of operation with increased risk associated with inadvertent operation.

The blade generally includes one or more cutting edges and a tang. In an out-the-front pocket knife, the blade has a deployed position and a retracted position. In the deployed position, the cutting edge is outside of a chassis or handle to allow use of the cutting edge as desired, and most if not all of the tang remains inside the chassis to provide stability between the blade and the chassis during use. In the retracted position, the entire blade is inside the chassis or handle to shield the cutting edge from inadvertent contact that might damage the blade or cause harm to personnel or objects. Since the entire blade is inside the chassis or handle in the retracted position, the length and width of the chassis determines the maximum length and width of the blade for the pocket knife.

Several competing design considerations must be balanced for a given chassis size. For example, the cutting edge of the blade is the operative portion of the pocket knife, and for a given chassis size, a blade with a longer cutting edge is generally desirable. For a given chassis size, however, a longer cutting edge results in a shorter tang, and a shorter tang reduces the stability between the blade and the chassis when the blade is deployed. Conversely, a longer tang provides increased stability between the blade and the chassis when the blade is deployed, but a longer tang requires a shorter cutting edge so the entire blade can fit inside the chassis when the blade is retracted. Therefore, the need exists for an improved design that allows for a longer cutting edge without sacrificing the stability provided by the tang.

BRIEF DESCRIPTION OF THE INVENTION

Aspects and advantages of the invention are set forth below in the following description, or may be obvious from the description, or may be learned through practice of the invention.

One embodiment of the present invention is a pocket knife that includes a chassis and a blade having a retracted position in which the blade is inside the chassis and a deployed position in which at least a portion of the blade is outside of the chassis. A tang of the blade has first and second legs that extend from the tang to define a recess in the tang between the first and second legs. At least a portion of the chassis extends into the recess in the tang between the first and second legs when the blade is in the retracted position.

An alternate embodiment of the present invention is a pocket knife that includes a first scale and a second scale opposed to the first scale to define a cavity between the first and second scales. A blade having a cutting edge has a retracted position in which the cutting edge is between the first and second scales and a deployed position in which the cutting edge is outside of the cavity. A tang of the blade has first and second legs that extend from the tang to define a recess in the tang between the first and second legs. At least a portion of at least one of the first or second scales extends into the recess in the tang between the first and second legs when the blade is in the retracted position.

In yet another embodiment of the present invention, a pocket knife includes a a first scale and a second scale opposed to the first scale to define a cavity between the first and second scales. A blade having a cutting edge has a retracted position in which the cutting edge is between the first and second scales and a deployed position in which the cutting edge is outside of the cavity. A slider, a front operator, and a rear operator are inside the cavity. The slider engages with the front operator to move the blade to the deployed position, and the slider engages with the rear operator to move the blade to the retracted position. A tang of the blade has first and second legs that extend from the tang to define a recess in the tang between the first and second legs. At least a portion of at least one of the first or second scales extends into the recess in the tang between the first and second legs when the blade is in the retracted position.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
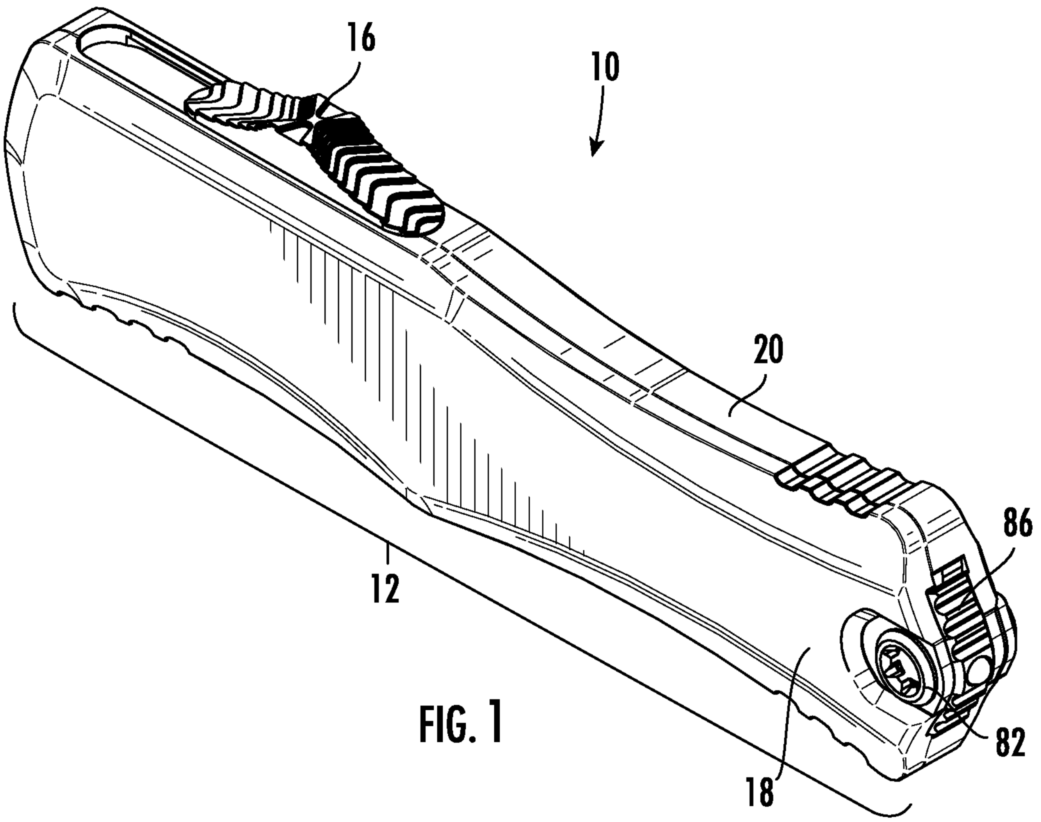
FIG. 1 is a perspective view of a pocket knife according to one embodiment of the present invention in a retracted position.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Embodiments of the present invention include a pocket knife that allows for a blade with a longer cutting edge for a given chassis size. For convention of reference, the term "front" shall refer to the end of the pocket knife from which a blade deploys; the term "rear" shall refer to the end of the pocket knife that is opposite from the front; the term "top" shall refer to the side of the pocket knife that houses an actuator for operating the pocket knife; the term "bottom" shall refer to the side of the pocket knife that is opposite from the top; and the terms "left" and "right" shall refer to the opposing sides of the pocket knife that are adjacent to and generally perpendicular to the top and bottom. As used herein, the term "longitudinal" shall refer to the direction between the front and rear of the pocket knife, and the term "radial" shall refer to any direction perpendicular to the longitudinal direction.

Figure 2:
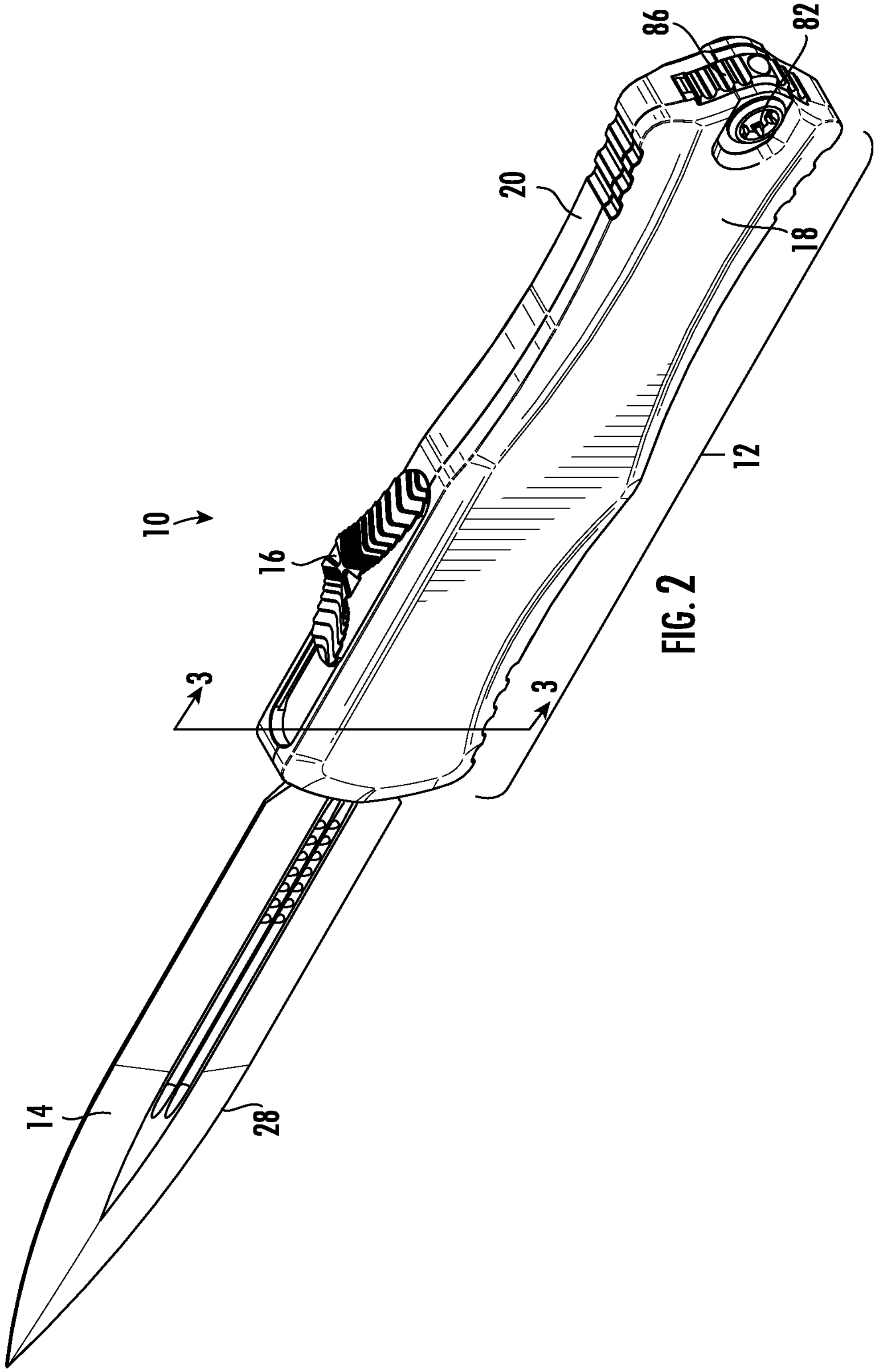
FIG. 2 is a perspective view of the pocket knife shown in FIG. 1 in a deployed position.
Figure 3:
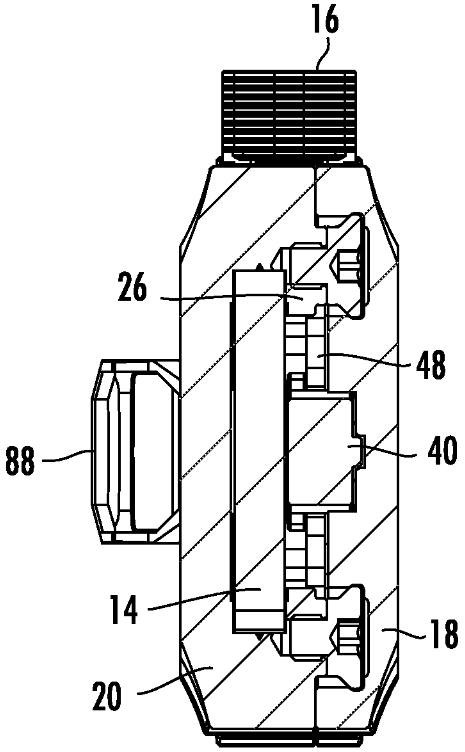
FIG. 3 is an axial cross-section of the pocket knife shown in FIG. 2 taken along 3-3.

FIGS. 1 and 2 provide perspective views of a pocket knife 10 according to one embodiment of the present invention in retracted and deployed positions, respectively, and FIG. 3 provides an axial cross-section of the pocket knife 10 shown in FIG. 2 taken along 3-3. As shown in FIGS. 1-3, the pocket knife 10 generally includes a chassis 12, a blade 14, and an actuator 16.

The chassis 12 provides a frame for supporting the various components associated with the pocket knife 10 and may be molded, pressed, or machined from plastics, metals, polymers, or any material or combination of materials having the desired strength and durability. The chassis 12 generally includes a first or left scale 18 opposed to a second or right scale 20, and when assembled together, the first and second scales 18, 20 produce a cavity 26 (shown in FIG. 3) inside the chassis 12.

Figure 11:
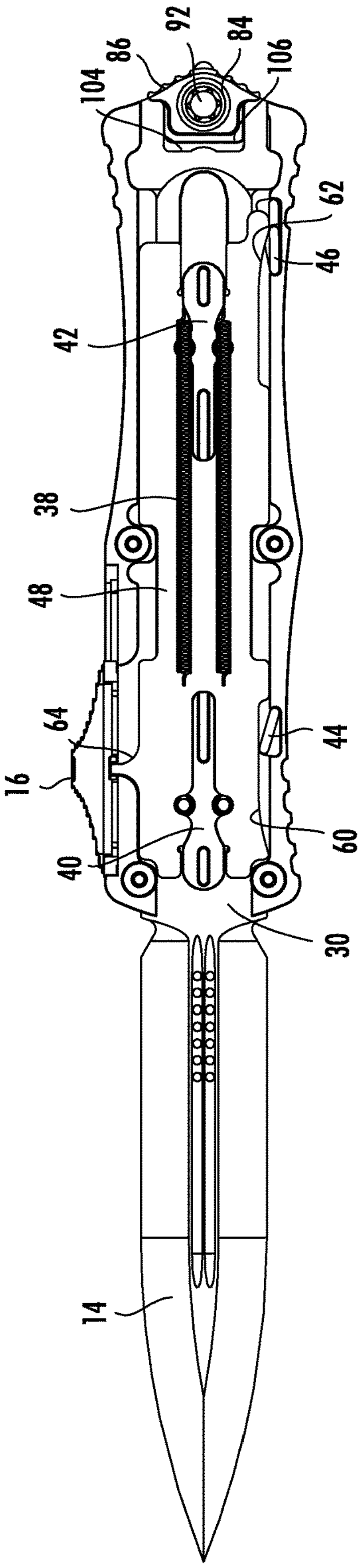
FIG. 11 is a left plan view of the pocket knife shown in FIGS. 1-3 with the left scale removed, the blade in the deployed position, the actuator in the open position, the slider in the front position, and the front lock engaged with the blade.
Figure 12:
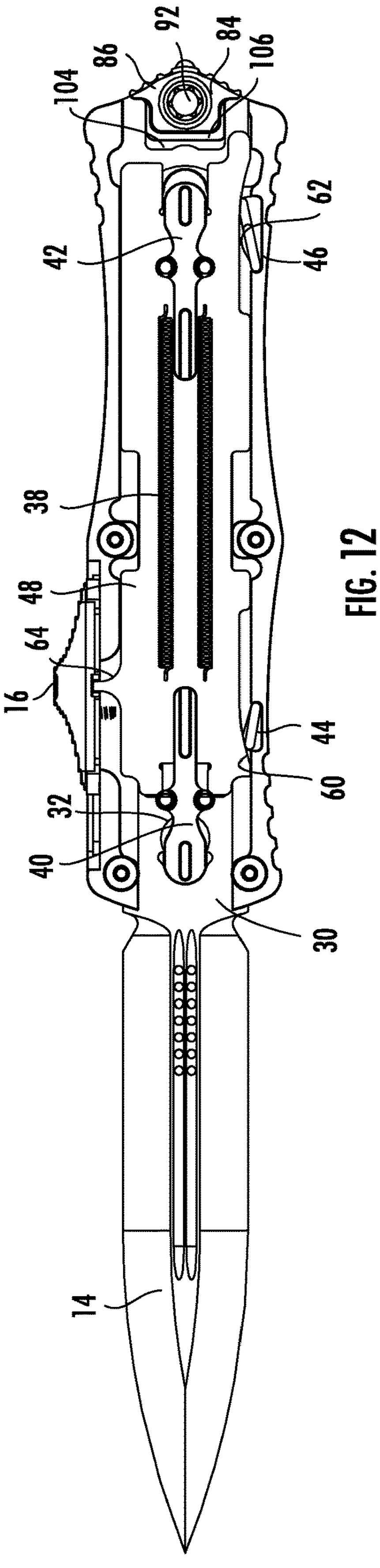
FIG. 12 is a left plan view of the pocket knife shown in FIGS. 1-3 with the left scale removed, the blade in the deployed position, the actuator in the shut position, the slider in the rear position, and the front lock released from the blade.

The blade 14 generally has one or more cutting edges 28 and can move between retracted and deployed positions. In the retracted position, as shown in FIGS. 1 and 8-10, the cutting edge 28 is inside of the cavity 26 or between the first and second scales 18, 20 to shield the cutting edge 28 from inadvertent contact that might damage the blade 14 or cause harm to personnel or objects. In the deployed position, as shown in FIGS. 2, 11, and 12, the cutting edge 28 is outside of the cavity 26 of the chassis 12 to allow use of the cutting edge 28 as desired.

For the embodiment shown in FIGS. 1-3, the actuator 16 is in sliding contact with the chassis 12 and controls the operation of the pocket knife 10. The actuator 16 has a shut or rear position, shown in FIGS. 1, 9, and 12, that moves the blade 14 to the retracted position and an open or front position, shown in FIGS. 2, 10, and 11, that moves the blade 14 to the deployed position.

Figure 4:
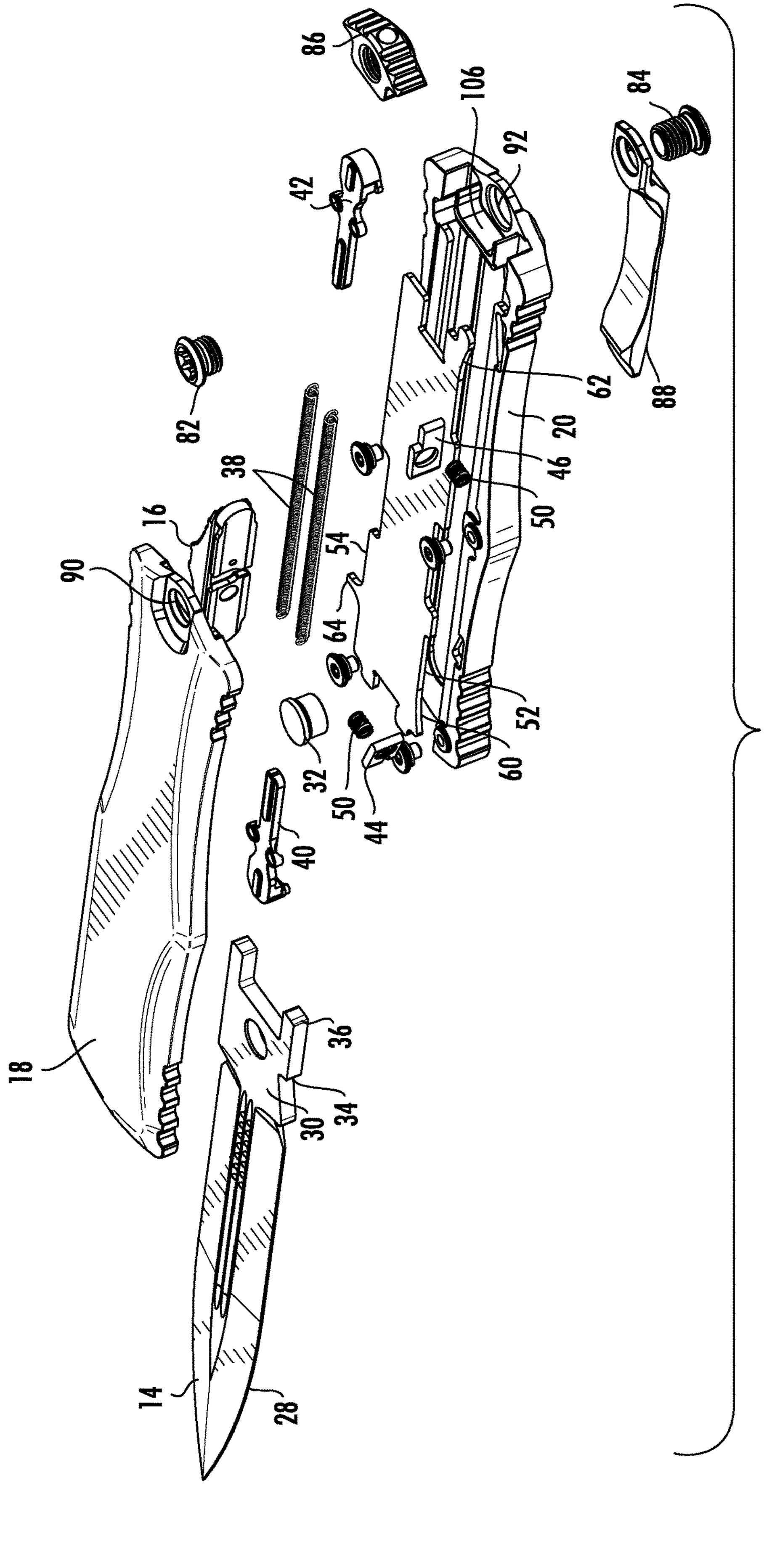
FIG. 4 is an exploded view of the pocket knife shown in FIGS. 1-3.

FIG. 4 provides an exploded view of the pocket knife 10 shown in FIGS. 1-3. As shown in FIG. 4, the rear portion of the blade 14 generally includes a tang 30, and the tang 30 of the blade 14 may include a post 32 and a notch 34 longitudinally separated from a rear surface 36 of the blade 14. In particular embodiments, the post 32 may be simply a projection from the tang 30, while in other embodiments, as shown in FIG. 4, the post 32 may be a separate part threaded or press-fit into the tang 30. The notch 34 may be on one or both sides of the tang 30. The purpose and operation of the post 32, notch 34, and rear surface 36 will be described in more detail with respect to operation of the blade 14 between the retracted and deployed positions as shown in FIGS. 9-12.

As shown most clearly in FIG. 4, one or more springs 38, front and rear operators 40, 42, front and rear locks 44, 46, and a slider 48 may be located inside the cavity 26 of the chassis 12. The springs 38 connect the front operator 40 to the rear operator 42. Although the front and rear operators 40, 42 shown in FIG. 4 are identical, they may not be identical in particular embodiments, and the present invention is not limited to identical front and rear operators 40, 42 unless recited in the claims. As will be explained in more detail with respect to FIGS. 9-12, the front and rear operators 40, 42 alternately engage with the tang 30 of the blade 14 and the slider 48 to move the blade 14 between the retracted and deployed positions.

The front and rear locks 44, 46 may be pivotally connected to the chassis 12 and biased radially inward in the cavity 26 by springs 50. With the blade 14 in the retracted position, the rear lock 46 is in biased engagement with the notch 34 in the tang 30 to lock the blade 14 inside the chassis 12. Conversely, with the blade 14 in the deployed position, the front lock 44 is in biased engagement with the rear surface 36 of the tang 30 to lock the blade 14 outside of the chassis 12.

The slider 48 has a bottom side 52 opposed to a top side 54 with a front sloped surface 60 and a rear sloped surface 62 on either of the bottom or top sides 52, 54. In the particular embodiment shown in FIG. 4, the front and rear sloped surfaces 60, 62 are located or defined on the bottom side 52 of the slider 48 to engage with the front and rear locks 44, 46 as the slider 48 moves longitudinally in the cavity 26. In alternate embodiments, the front and rear sloped surfaces 60, 62 may be located or defined on opposite sides 52, 54 of the slider 48 to correspond to the positions of the associated front and rear locks 44, 46, and the present invention is not limited to the specific location of the front and rear sloped surfaces 60, 62 unless specifically recited in the claims.

A tab 64 may extend from whichever side of the slider 48 is closest to the actuator 16 so that the tab 64 engages with the actuator 16 and the actuator 16 and the slider 48 move together. In the particular embodiment shown in FIG. 4, for example, the tab 64 extends from the top side 54 of the slider

48. In this manner, forward and rearward movement of the actuator 16 moves the slider 48 the same direction and distance.

The slider 48 has a rear position that moves the blade 14 to the retracted position and a front position that moves the blade 14 to the deployed position. Specifically, with the slider 48 in the front position and the blade 14 locked in the deployed position, as the slider 48 moves to the rear position, the slider 48 engages with the rear operator 42 to increase tension in the springs 38. Rearward movement of the slider 48 causes the front sloped surface 60 to engage with the front lock 44 to pivot the front lock 44 outward, disengaging the front lock 44 from the rear surface 36 of the tang 30 to allow the springs 38 to pull the front operator 40 against the post 32 in the tang 30 to move the blade 14 to the retracted position. Conversely, with the slider 48 in the rear position and the blade 14 locked in the retracted position, as the slider 48 moves to the front position, the slider 48 engages with the front operator 40 to increase tension in the springs 38. Forward movement of the slider 48 causes the rear sloped surface 62 to engage with the rear lock 46 to pivot the rear lock 46 outward, disengaging the rear lock 46 from the notch 34 in the tang 30 of the blade 14 to allow the springs 38 to pull the rear operator 42 against the post 32 in the tang 30 to move the blade 14 to the deployed position.

Figure 5:
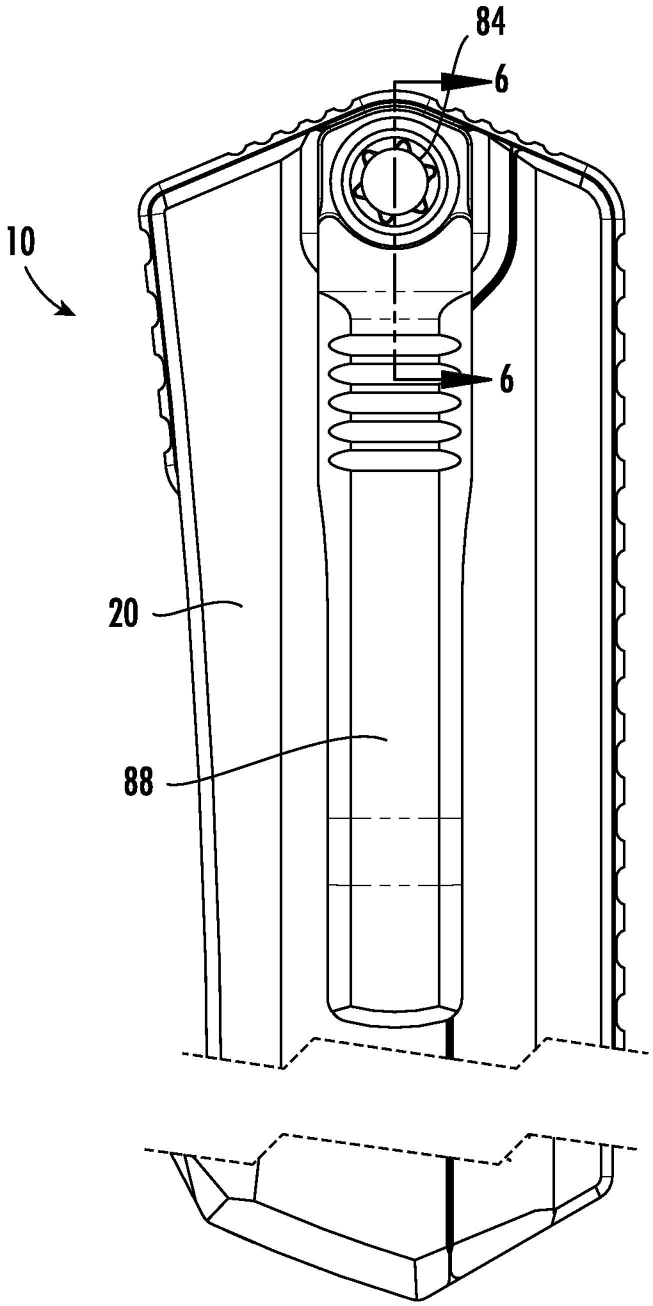
FIG. 5 is a right plan view of the pocket knife shown in FIG. 1.
Figure 6:
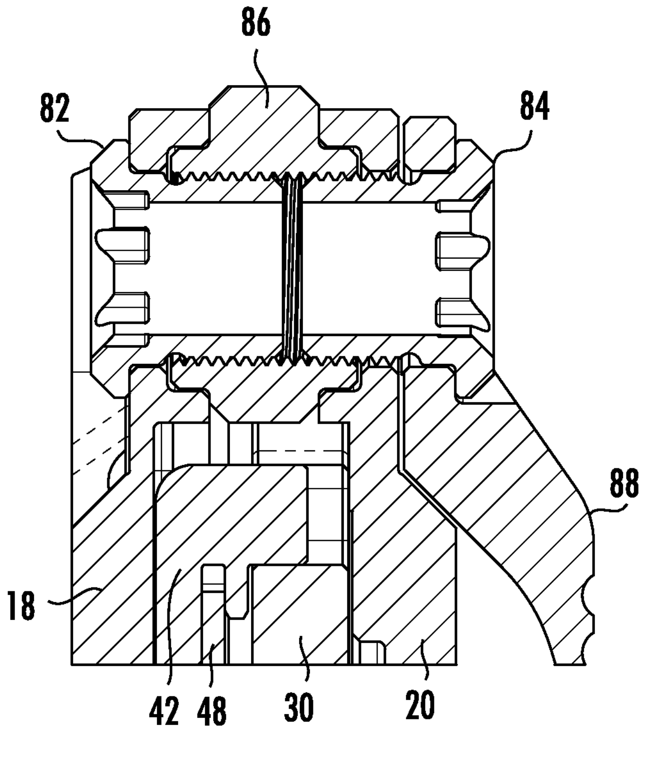
FIG. 6 is a cross-section view of the pocket knife shown in FIG. 5 taken along 6-6.

FIG. 5 provides a right plan view of the pocket knife 10 shown in FIG. 1, and FIG. 6 provides a cross-section view of the pocket knife 10 shown in FIG. 5 taken along 6-6. As shown in the right portion of FIG. 4 and FIGS. 5 and 6, the pocket knife 10 may further include a means for releasably connecting the first or left scale 18 to the second or right scale 20. The function of the means is to releasably connect the first or left scale 18 to the second or right scale 20. The structure for performing the function may include one or more screws or fasteners that releasably engage with the left and/or right scales 18, 20. In the particular embodiment shown in FIGS. 4-6, the structure for releasably connecting the first or left scale 18 to the second or right scale 20 is a first or left screw 82, a second or right screw 84, and a threaded spacer 86. The threaded spacer 86 may be located between the left and right scales 18, 20, for example at the rear of the chassis 12 proximate to a pocket clip 88. The left screw 82 fits through an aperture 90 in the left scale 18 and threads into the threaded spacer 86. The right screw 84 similarly fits through an aperture 92 in the right scale 20 and threads into the threaded spacer 86. In this manner, the left and right screws 82, 84 releasably connect the left and right scales 18, 20, respectively, to the threaded spacer 86, thereby releasably connecting the left scale 18 to the right scale 20.

Figure 7:
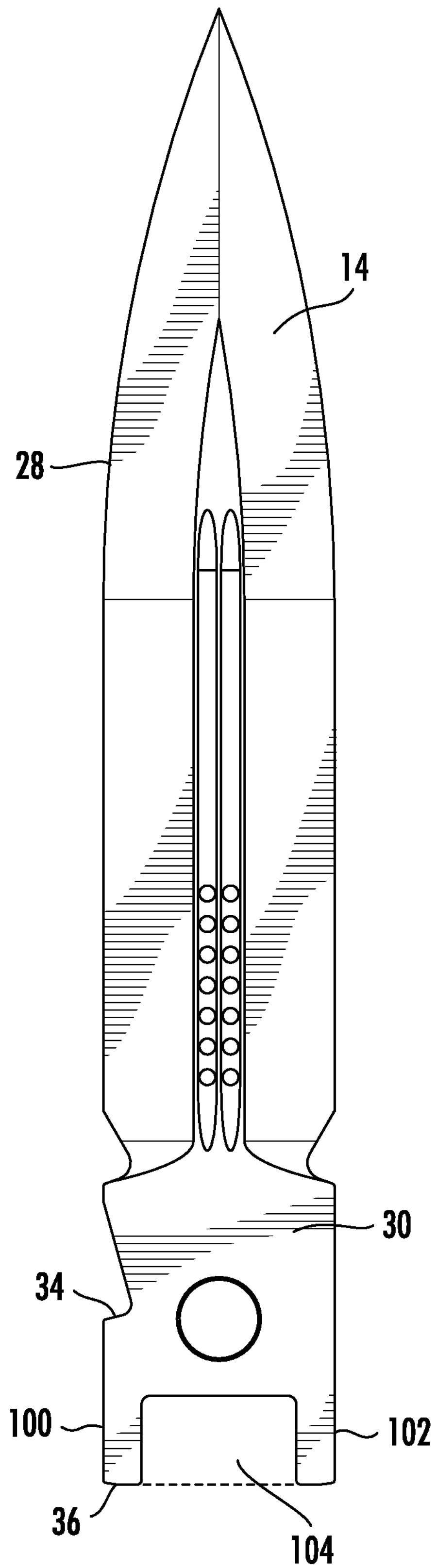
FIG. 7 is a left plan view of the blade shown in FIG. 4 according to one embodiment of the present invention.

FIG. 7 provides a left plan view of the blade 14 shown in FIG. 4 according to one embodiment of the present invention. As shown most clearly in FIG. 7, first and second legs 100, 102 extend from the tang 30 of the blade 14 to define a recess 104 in the tang 30 between the first and second legs 100, 102. The first and second legs 100, 102 increase the longitudinal length of the tang 30 to enhance stability between the blade 14 and the chassis 12 when the blade is deployed. The recess 104 in the tang 30 between the first and second legs 100, 102 allows a protrusion 106 of the chassis 12 or the first and/or second scales 18, 20 to extend into the recess 104 in the tang 30 between the first and second legs 100, 102 when the blade 14 is in the retracted position.

Figure 8:
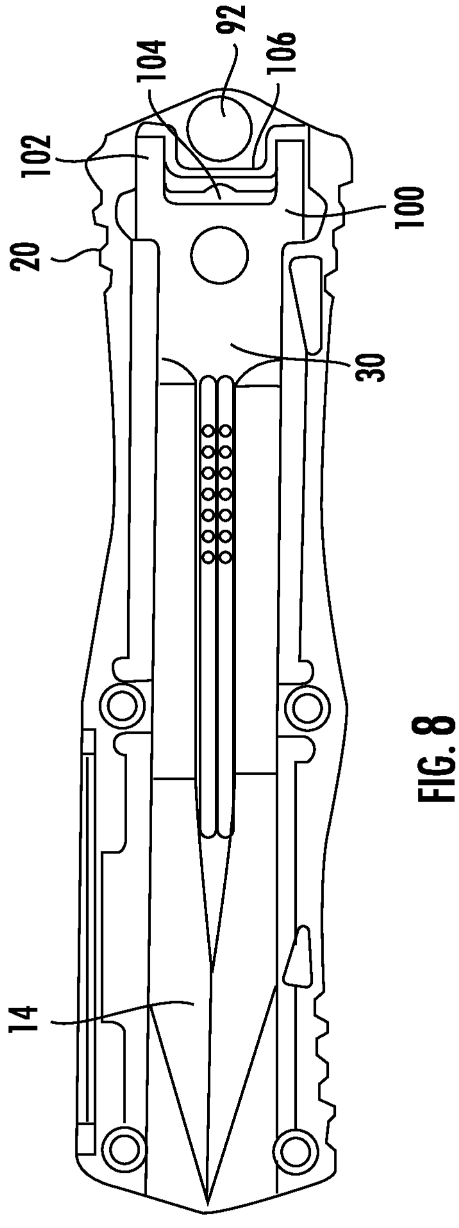
FIG. 8 is a left plan view of the pocket knife shown in FIGS. 1-3 with the blade in the retracted position and the actuator, left scale, and slider removed.

FIG. 8 provides a left plan view of the pocket knife 10 shown in FIGS. 1-3 with the blade 14 in the retracted position and the actuator 16, left scale 18, and slider 48 removed. As shown in FIG. 8, the protrusion 106 of the chassis 12 extends into the recess 104 in the tang 30 between the first and second legs 100, 102 when the blade 14 is in the retracted position. As also shown in FIG. 8, at least a portion of the aperture 92 through the right scale 20 overlaps the recess 104 in the tang 30 between the first and second legs 100, 102 when the blade is in the retracted position. Similarly, at least a portion of the aperture 90 through the left scale 18 may overlap the recess 104 in the tang 30 between the first and second legs 100, 102 when the blade is in the retracted position and the left scale 18 is assembled with the right scale 20. Alternately or in addition, at least a portion of the means for releasably connecting the first scale 18 to the second scale 20, as shown in FIGS. 5 and 6, is located in the recess 104 in the tang 30 between the first and second legs 100, 102 when the blade 14 is in the retracted position.

The presence of the first and second legs 100, 102 and resulting recess 104 in the tang 30 thus allows the blade 14 to have a longitudinally longer cutting edge 28 without reducing the longitudinal length of the tang 30 or increasing the overall length of the blade 14. As a result, the blade 14 can have a longer cutting edge 28 without extending the overall length of the blade 14 or reducing the stability between the blade 14 and the chassis 12 provided by the tang 30 when the blade 14 is in the deployed position.

Figure 9:
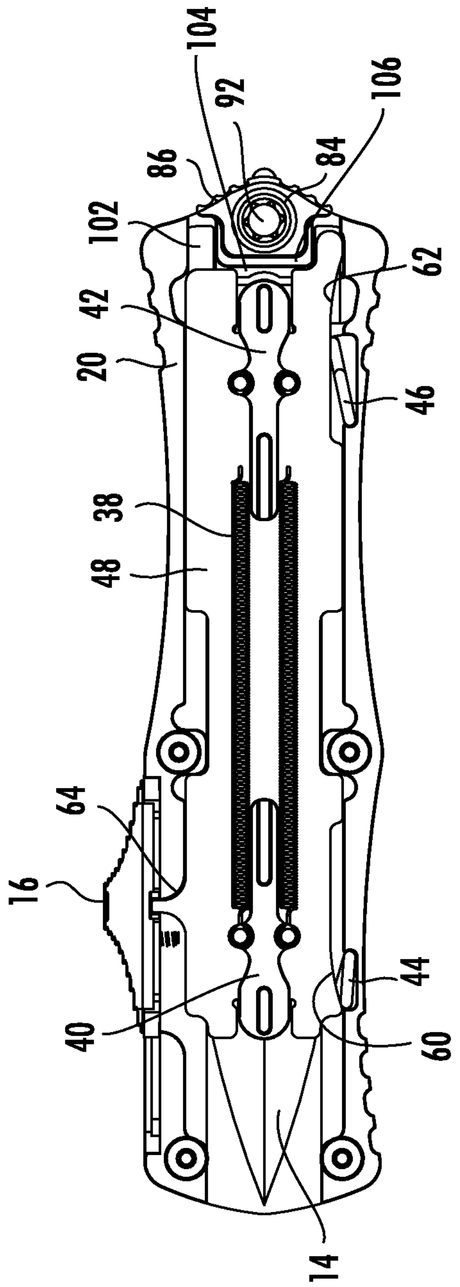
FIG. 9 is a left plan view of the pocket knife shown in FIGS. 1-3 with the left scale removed, the blade in the retracted position, the actuator in the shut position, the slider in the rear position, and the rear lock engaged with the blade.

Operation of the pocket knife 10 between the retracted and deployed positions will now be described with respect to FIGS. 9-12. As shown in FIG. 9, the actuator 16 is in the shut position, and the slider 48 is in the rear position with the blade 14 retracted inside the cavity 26. With the blade 14 in the retracted position, the rear operator 42 is engaged with the post 32 of the tang 30, and the rear lock 46 is engaged with the notch 34 in the tang 30 to retain the blade 14 in the retracted position.

Figure 10:
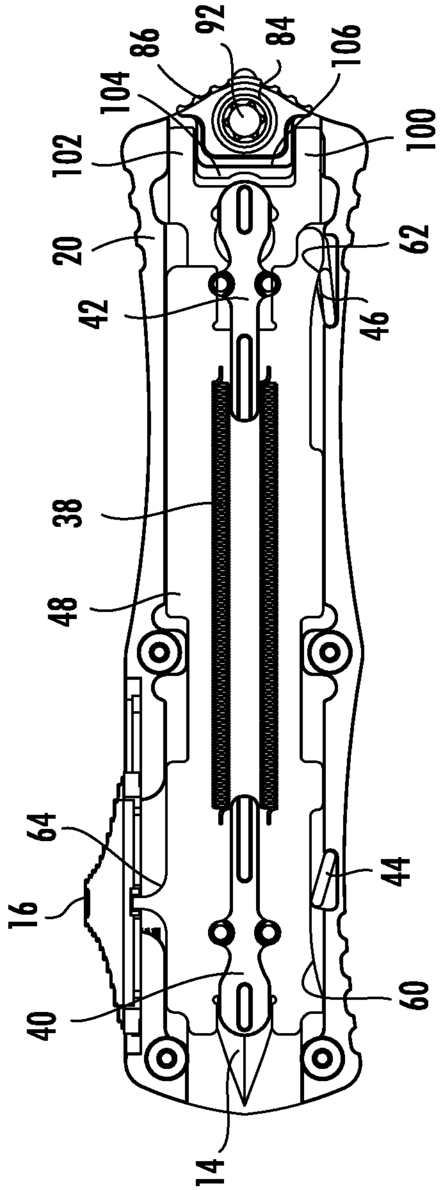
FIG. 10 is a left plan view of the pocket knife shown in FIGS. 1-3 with the left scale removed, the blade in the retracted position, the actuator in the open position, the slider in the front position, and the rear lock released from the blade.

To deploy the blade 14, the actuator 16 is moved forward to the open position as shown in FIG. 10, and the engagement between the tab 64 and the actuator 16 causes the slider 48 to move forward with the actuator 16. As the slider 48 initially moves forward, the rear lock 46 remains engaged with the notch 34 in the tang 30 to prevent the blade 14 from moving, and the front of the slider 48 engages with the front operator 40 to move the front operator 40 forward and increase tension in the springs 38 between the front and rear operators 40, 42. Eventually, the rear sloped surface 62 on the bottom side 52 of the slider 48 disengages the rear lock 46 from the notch 34 to release the blade 14, as shown in FIG. 10.

When the rear lock 46 disengages from the notch 34, the tension in the springs 38 causes the rear operator 42 to eject the blade 14 out of the cavity 26 to the deployed position, as shown in FIG. 11. The blade 14 moves out of the cavity 26 until the post 32 contacts the front operator 40 to prevent further travel of the blade 14 out of the cavity 26. As shown in FIG. 11, the actuator 16 is in the open position with the blade 14 deployed outside of the cavity 26. In the deployed position, the front operator 40 is engaged with the post 32, and the front lock 44 is engaged with the rear surface 36 of the tang 30 to hold the blade 14 in the deployed position.

To retract the blade 14, the actuator 16 is moved rearward to the shut position as shown in FIG. 12, and the engagement between the tab 64 and the actuator 16 causes the slider 48 to move rearward with the actuator 16. As the slider 48 initially moves rearward, the front lock 44 remains engaged with the rear surface 36 of the tang 30 to prevent the blade 14 from moving, and the rear of the slider 48 engages with the rear operator 42 to move the rear operator 42 rearward and increase tension in the springs 38 between the front and rear operators 40, 42. Eventually, the front sloped surface 60 on the bottom side 52 of the slider 48 disengages the front lock 44 from the rear surface 36 of the tang 30 to release the blade 14, as shown in FIG. 12.

When the front lock 44 disengages from the rear surface 36 of the tang 30, the tension in the springs 38 causes the front operator 40 to pull the blade 14 into the cavity 26 to the retracted position, as shown in FIG. 9. The blade 14 moves into the cavity 26 until the post 32 of the tang 30 contacts the rear operator 42, and the rear lock 46 again engages with the notch 34 in the tang 30 to retain the blade 14 in the retracted position.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A pocket knife, comprising:

a chassis;

a blade having a retracted position in which the blade is inside the chassis and a deployed position in which at least a portion of the blade is outside of the chassis;

a tang of the blade;

first and second legs that extend from the tang to define a recess in the tang between the first and second legs; and a protrusion of the chassis extends into the recess in the tang between the first and second legs when the blade is in the retracted position.

2. The pocket knife as in claim 1, further comprising an aperture through the chassis and at least a portion of the aperture overlaps the recess in the tang between the first and second legs when the blade is in the retracted position.

3. The pocket knife as in claim 1, further comprising a front operator inside the chassis, wherein the front operator engages with the blade to move the blade to the retracted position.

4. The pocket knife as in claim 1, further comprising a rear operator inside the chassis, wherein the rear operator engages with the blade to move the blade to the deployed position.

5. The pocket knife as in claim 1, further comprising a front lock inside the chassis and engaged with the blade in the deployed position.

6. The pocket knife as in claim 1, further comprising a rear lock inside the chassis and engaged with the blade in the retracted position.

7. A pocket knife, comprising:

a first scale;

a second scale opposed to the first scale to define a cavity between the first and second scales, a blade having a cutting edge, wherein the blade has a retracted position in which the cutting edge is between the first and second scales and a deployed position in which the cutting edge is outside of the cavity;

a tang of the blade;

first and second legs that extend from the tang to define a recess in the tang between the first and second legs; and a protrusion of at least one of the first scale or the second scale extends into the recess in the tang between the first and second legs when the blade is in the retracted position.

8. The pocket knife as in claim 7, further comprising an aperture through the first and second scales and at least a portion of the aperture overlaps the recess in the tang between the first and second legs when the blade is in the retracted position.

9. The pocket knife as in claim 7, further comprising a means for releasably connecting the first scale to the second scale and at least a portion of the means for releasably connecting the first scale to the second scale is located in the recess in the tang between the first and second legs when the blade is in the retracted position.

10. The pocket knife as in claim 7, further comprising a front operator between the first and second scales, wherein the front operator engages with the blade to move the blade to the retracted position.

11. The pocket knife as in claim 7, further comprising a rear operator between the first and second scales, wherein the rear operator engages with the blade to move the blade to the deployed position.

12. The pocket knife as in claim 7, further comprising a front lock between the first and second scales and engaged with the blade in the deployed position.

13. The pocket knife as in claim 7, further comprising a rear lock between the first and second scales and engaged with the blade in the retracted position.

14. A pocket knife, comprising:

a first scale;

a second scale opposed to the first scale to define a cavity between the first and second scales;

a blade having a cutting edge, wherein the blade has a retracted position in which the cutting edge is between the first and second scales and a deployed position in which the cutting edge is outside of the cavity;

a slider inside the cavity;

a front operator inside the cavity, wherein the slider engages with the front operator to move the blade to the deployed position;

a rear operator inside the cavity, wherein the slider engages with the rear operator to move the blade to the retracted position;

a tang of the blade;

first and second legs that extend from the tang to define a recess in the tang between the first and second legs; and a protrusion of at least one of the first scale or the second scale extends into the recess in the tang between the first and second legs when the blade is in the retracted position.

15. The pocket knife as in claim 14, further comprising an aperture through the first and second scales and at least a portion of the aperture overlaps the recess in the tang between the first and second legs when the blade is in the retracted position.

16. The pocket knife as in claim 14, further comprising a means for releasably connecting the first scale to the second scale and at least a portion of the means for releasably connecting the first scale to the second scale is located in the recess in the tang between the first and second legs when the blade is in the retracted position.

17. The pocket knife as in claim 14, further comprising a front lock inside the cavity and engaged with the blade in the deployed position.

18. The pocket knife as in claim 14, further comprising a rear lock inside the cavity and engaged with the blade in the retracted position.

19. The pocket knife as in claim 14, further comprising a spring connecting the front operator to the rear operator inside the cavity.

* * * * *